United States Patent
Koga

(10) Patent No.: US 11,976,185 B2
(45) Date of Patent: May 7, 2024

(54) RUBBER COMPOSITION

(71) Applicant: NOK CORPORATION, Tokyo (JP)

(72) Inventor: Atsushi Koga, Kanagawa (JP)

(73) Assignee: NOK CORPORATION, Tokyo (JP)

(*) Notice: Subject to any disclaimer, the term of this patent is extended or adjusted under 35 U.S.C. 154(b) by 695 days.

(21) Appl. No.: 16/982,360

(22) PCT Filed: Mar. 14, 2019

(86) PCT No.: PCT/JP2019/010521
§ 371 (c)(1),
(2) Date: Sep. 18, 2020

(87) PCT Pub. No.: WO2019/188338
PCT Pub. Date: Oct. 3, 2019

(65) Prior Publication Data
US 2021/0108057 A1    Apr. 15, 2021

(30) Foreign Application Priority Data
Mar. 28, 2018 (JP) ................ 2018-062109

(51) Int. Cl.
| C08L 23/08 | (2006.01) |
| C08K 5/09 | (2006.01) |
| C08K 5/101 | (2006.01) |
| C08K 5/14 | (2006.01) |
| C08K 5/20 | (2006.01) |
| C08L 83/04 | (2006.01) |

(52) U.S. Cl.
CPC ............. C08L 23/08 (2013.01); C08K 5/09 (2013.01); C08K 5/14 (2013.01); C08K 5/20 (2013.01); C08L 83/04 (2013.01)

(58) Field of Classification Search
CPC .......... C08K 5/20; C08K 5/098; C08K 5/101; C08K 5/14; C08L 83/04; C08L 23/083; C08L 23/0807; C08L 23/0823; C08F 36/20
See application file for complete search history.

(56) References Cited

U.S. PATENT DOCUMENTS

| 5,349,020 A | 9/1994 | Okada et al. |
| 2012/0319331 A1 | 12/2012 | Fontenot, III et al. |
| 2016/0347894 A1* | 12/2016 | Endo .................... C09K 3/1006 |
| 2018/0072877 A1* | 3/2018 | Ichino .................... C08J 3/24 |
| 2019/0040245 A1 | 2/2019 | Sakurai et al. |

FOREIGN PATENT DOCUMENTS

| GB | 2047254 | * | 11/1980 | |
| JP | 55-069636 A | | 5/1980 | |
| JP | 56-106941 A | | 8/1981 | |
| JP | 56-106942 A | | 8/1981 | |
| JP | 57-162737 A | | 10/1982 | |
| JP | 57-176606 A | | 10/1982 | |
| JP | 61-264035 A | | 11/1986 | |
| JP | 03-223357 | | 10/1991 | |
| JP | 05-247284 A | | 9/1993 | |
| JP | 09-156053 A | | 6/1997 | |
| JP | 2000-103917 A | | 4/2000 | |
| JP | 2002201313 | * | 7/2002 | |
| JP | 2005-075964 A | | 3/2005 | |
| JP | 2007224265 A | * | 9/2007 | ............ C09K 5/14 |
| JP | 2010202807 A | * | 9/2010 | |
| JP | 2010-280831 A | | 12/2010 | |
| JP | 2015-010020 A | | 1/2015 | |
| JP | 2017-075293 A | | 4/2017 | |
| JP | 2018-002959 A | | 1/2018 | |
| WO | 2006/101915 A2 | | 9/2006 | |
| WO | 2015-122415 A1 | | 8/2015 | |
| WO | 2017/170190 A1 | | 10/2017 | |
| WO | 2017/179289 A1 | | 10/2017 | |

OTHER PUBLICATIONS

JP 2002 201313 machine translation (2002).*
ISR issued in WIPO Patent App. PCT/JP2019/010521, Apr. 16, 2020, English translation.
IPRP issued in WIPO Patent App. PCT/JP2019/010521, Sep. 29, 2020, English translation.

* cited by examiner

*Primary Examiner* — Marc S Zimmer
(74) *Attorney, Agent, or Firm* — GREENBLUM & BERNSTEIN, P.L.C.

(57) ABSTRACT

A rubber composition comprising 0.1 to 2.5 parts by weight of a lubricant having a flow temperature of 50 to 100° C. based on 100 parts by weight of an ethylene/butene/5-ethylidene-2-norbornene terpolymer. This rubber composition is compounded with a specific lubricant, has the following effects. That is, the rubber composition prevents difficulties caused by sticking between unvulcanized rubber compound, improves productivity in the rubber compound preparation process and the vulcanization molding process of crosslinked molded products, such as seal members, and does not impair the low temperature properties of the crosslinked molded products. This rubber composition is effectively used as a crosslinking molding material for seal parts, for which a high pressure gas sealing function is particularly required in a low temperature environment, e.g., −39° C. or lower.

4 Claims, No Drawings

RUBBER COMPOSITION

TECHNICAL FIELD

The present disclosure relates to a rubber composition. More particularly, the present disclosure relates to an ethylene/butene/5-ethylidene-2-norbornene terpolymer rubber composition.

BACKGROUND ART

Since ethylene/propylene/diene copolymer rubber (EPDM), which exhibits sealing properties at high and low temperatures, has no unsaturated bond in the main chain, rubber strength and low temperature properties are in conflict with the increase in the ethylene content. Therefore, it is difficult to achieve, using EPDM compositions, sealing properties at a low temperature exceeding a certain temperature limit.

In order to obtain a rubber molded product having particularly excellent low temperature rubber characteristics while maintaining the same level of hardness as conventional rubber molded products using EPDM, the present applicant has previously proposed a rubber composition comprising an ethylene/butene/ethylidene norbornene terpolymer [EBENB], carbon black, a hardness modifier, and a crosslinking agent (Patent Document 1).

This rubber composition provides a rubber molded product the having same level of hardness as conventional rubber molded products using EPDM and having particularly excellent low temperature rubber characteristics; however, EBENB had problems that the productivity was extremely low in the rubber compound preparation process and in the vulcanization molding process of crosslinked molded products, such as seal members, due to its very high polymer copolymer adhesion, particularly sticking between unvulcanized rubber compound.

PRIOR ART DOCUMENTS

Patent Documents

Patent Document 1: WO 2017/170190 A1

OUTLINE OF THE INVENTION

Problem to be Solved by the Invention

An object of the present disclosure is to provide an EBENB rubber composition that improves productivity in the rubber compound preparation process and the vulcanization molding process of crosslinked molded products, such as seal members, due to sticking between unvulcanized rubber compound and that does not impair the low temperature properties of the crosslinked molded products.

Means for Solving the Problem

The above object of the present disclosure can be achieved by a rubber composition comprising 0.1 to 2.5 parts by weight of a lubricant having a flow temperature of 50 to 100° C. based on 100 parts by weight of an ethylene/butene/5-ethylidene-2-norbornene terpolymer.

Effect of the Invention

The rubber composition according to the present disclosure, which is compounded with a specific lubricant, has the following effects. That is, the rubber composition prevents difficulties caused by sticking between unvulcanized rubber compound, improves productivity in the rubber compound preparation process and the vulcanization molding process of crosslinked molded products, such as seal members, and does not impair the low temperature properties of the crosslinked molded products.

This rubber composition is effectively used as a crosslinking molding material for seal parts, for which a high pressure gas sealing function is particularly required in a low temperature environment, e.g., −39° C. or lower.

EMBODIMENTS FOR CARRYING OUT THE INVENTION

In the rubber composition, the characteristics of rubber materials, such as EBENB and EPDM, greatly affect the material costs of the entire rubber composition and the production efficiency. EBENB is superior in cold resistance as compared with EPDM; therefore, a rubber composition having desired low temperature rubber characteristics can be achieved with a less compounding amount than EPDM, and the material costs can be reduced as the entire rubber composition.

Moreover, EBENB is more flexible as compared with EPDM, is thus excellent in processability, such as kneadability, dispersibility and moldability, and greatly improves the production efficiency. Therefore, the costs in the production process can be reduced.

Thus, according to the rubber composition of the present disclosure using EBENB, the production costs of rubber molded products can be reduced, as compared with conventional rubber compositions using EPDM, in terms of the material costs and production efficiency.

As EBENB, any one obtained by copolymerizing ethylene and butene with a small amount (about 0.1 to 20 wt. %, preferably about 3 to 15 wt. %) of 5-ethylidene-2-norbornene component can be used. In practice, commercial products, such as Metallocene EBT (produced by Mitsui Chemicals, Inc.), can be used as they are.

The iodine value of EBENB is preferably about 3 to 20 g/100 g, more preferably about 5 to 18 g/100 g. Within the above range, it is possible to prevent deterioration of rubber molded products due to excellent heat aging resistance and weather resistance, to maintain a stable molecular state even in a low temperature environment, and eventually to improve low temperature sealing properties.

The Mooney viscosity $ML_{1+4}$ (100° C.) of EBENB is preferably about 10 to 45, more preferably about 15 to 35. If the Mooney viscosity is too low, the compression set may increase, and the tensile strength may decrease. In contrast, if the Mooney viscosity is too high, the physical properties are improved, but the processability may be deteriorated. The Mooney viscosity $ML_{1+4}$ (100° C.) can be determined according to the definition of JIS K 6300-1: 2013.

The content of the ethylene component in EBENB is preferably about 60 to 80 wt. %, and more preferably about 65 to 75 wt. %. Within this range, the glass transition temperature Tg of EBENB shows the minimum value, and the cold resistance is improved.

EBENB is compounded with 0.1 to 2.5 parts by weight, preferably 0.5 to 2.2 parts by weight, of a lubricant having a flow temperature (according to JIS K5601-2-2 corresponding to ISO 4625) of about 50 to 100° C., preferably about 60 to 95° C., based on 100 parts by weight thereof. Here, the flow temperature of the lubricant refers to the lowest temperature at which a flow state can be maintained.

If the flow temperature is lower than this range, sticking may occur between unvulcanized rubber compound. In contrast, if the flow temperature is higher than this range, adhesion to the kneading machine during kneading cannot be prevented.

Further, if the compounding ratio is less than the above range, sticking between unvulcanized rubber compound cannot be prevented. In contrast, if the compounding ratio is greater than the above range, the low temperature sealing properties are impaired.

As the lubricant having a flow temperature of about 50 to 100° C., preferably about 60 to 95° C., a fatty acid metal salt-based, fatty acid amide-based, fatty acid ester-based, or organosilicon-based lubricant is used.

As the fatty acid metal salt-based lubricant, for example, zinc salts of higher saturated or unsaturated fatty acids having 12 or more carbon atoms, such as lauric acid, myristic acid, palmitic acid, stearic acid, and oleic acid, are used.

As the fatty acid amide-based lubricant, for example, monoamides, substituted monoamides, bisamides, and methylolamides of the above-mentioned higher fatty acids are used.

As the fatty acid ester-based lubricant, for example, lower alkyl esters having 5 or less carbon atoms, such as methyl, ethyl, and butyl of the above-mentioned higher fatty acids are used.

Further, as the organosilicone-based lubricant, for example, a compound having a siloxane bond in the main chain, and a mixture of the compound with an inorganic carrier are used.

The crosslinking agent is mainly preferably an organic peroxide. Examples of organic peroxides include tert-butyl peroxide, dicumyl peroxide, 2,5-dimethyl-2,5-di-tert-butylperoxyhexane, 2,5-dimethyl-2,5-di-tert-butylperoxyhexine-3, tert-butylcumyl peroxide, 1,3-di-tert-butylperoxyisopropylbenzene, 2,5-dimethyl-2,5-dibenzoylperoxyhexane, tert-butyl peroxybenzoate, tert-butyl peroxyisopropyl carbonate, n-butyl-4,4-di-tert-butylperoxyvalerate, and the like.

The amount of crosslinking agent to be compounded is preferably about 0.5 to 10 parts by weight, more preferably about 1 to 5 parts by weight, based on 100 parts by weight of EBENB. Within the above range, it is possible to prevent that molding cannot be performed due to foaming during vulcanization, and further, the resulting product is likely to have sufficient physical properties, since the crosslinking density becomes good.

Moreover, a master batch containing the above-mentioned organic peroxide, such as DCP30ZP03K (30 wt. % of dicumyl peroxide, 30 wt. % of Zetpol 2010L, and 40 wt. % of SRF carbon black) produced by Zeon Corporation, can also be used. Such a masterbatch is preferable from the viewpoint that kneadability and dispersibility can be improved during preparation of the rubber composition.

Further, a crosslinking accelerator may be contained, if necessary. As the crosslinking accelerator, triallyl isocyanurate, triallyl cyanate, liquid polybutadiene, N,N'-m-phenylenedimaleimide, trimethylolpropane trimethacrylate, or the like can be used. By compounding and adding a suitable amount of crosslinking accelerator, crosslinking efficiency can be improved, and further heat resistance and mechanical properties can be improved; thus, the stability as a seal part can also be improved.

In addition to the above components, the rubber composition may suitably contain, if necessary, compounding agents generally used in the rubber industry, such as fillers, acid acceptors, and antioxidants, as rubber compounding agents. The amount of rubber compounding agent to be compounded is preferably about 300 parts by weight or less based on 100 parts by weight of EBENB.

Examples of the fillers include inorganic fillers, such as carbon black, silica, silicate, calcium carbonate, magnesium carbonate, clay, talc, bentonite, sericite, mica, alumina hydrate, and barium sulfate; and resin-based fillers, such as polyethylene, polypropylene, polystyrene, coumarone-indene resin, melamine resin, and phenol resin.

When carbon black is used, one having a DBP oil absorption of 100 ml/100 g or more is preferable. Further, when silica is used, it is preferable to use a silane coupling agent in combination.

The rubber composition can be prepared by kneading the various materials using a kneading machine, such as a single screw extruder, a twin screw extruder, a roll, a Banbury mixer, a kneader, or a high shear mixer.

Moreover, the rubber composition can be crosslinked by pressure vulcanization generally at about 150 to 230° C. for about 0.5 to 30 minutes using an injection molding machine, a compression molding machine, or the like. Further, after the above primary vulcanization is performed, a secondary vulcanization may be performed, if necessary, in order to reliably vulcanize the inside of the vulcanized product. The secondary vulcanization can be generally performed by oven heating at about 150 to 250° C. for about 0.5 to 24 hours.

The rubber molded product obtained by vulcanizing and molding the rubber composition according to the present disclosure has excellent low temperature rubber properties particularly at −50° C. and is suitable as a rubber molded product to be used in a low temperature environment (e.g., about −40° C. to −60° C.). Such a rubber molded product preferably has a TR70 value of −39° C. or lower, as measured by the low temperature elastic recovery test specified in JIS K6261: 2006 corresponding to ISO 2921.

Further, the rubber molded product of the present disclosure preferably has an appropriate hardness. For example, when the rubber molded product is an O-ring, the Type A durometer hardness specified in JIS K6253-1: 2012 is preferably 65 to 95.

Examples of the rubber molded product include seal parts used for sealing high pressure gas of low temperature, insulators, vibration isolators, sound insulators, and the like. Among them, the rubber molded product is suitably used as a seal part used in a low temperature environment and having excellent low temperature sealing properties, particularly as a seal part for high pressure gas (e.g., high pressure hydrogen) equipment.

The shape of the rubber molded product according to the present disclosure is not particularly limited, and can be various shapes according to its application. Examples of the shape as the seal parts include O-rings, packings, sheets, and the like.

EXAMPLES

The following describes the present disclosure with reference to Examples.

Example 1

| | |
|---|---|
| EBENB (Metallocene EBT, produced by Mitsui Chemicals, Inc.) | 100 parts by weight |
| HAF CB (Asahi #70, produced by Asahi Carbon Co., Ltd. DBF oil absorption amount: 101 ml/100 g) | 70 parts by weight |
| Zinc oxide | 5 parts by weight |
| Stearic acid | 1 part by weight |
| Fatty acid amide lubricant (Diamide O-200, produced by Nippon Kasei Chemical Company Limited; purified oleic acid amide; flow temperature: 73° C.) | 2 parts by weight |
| Plasticizer (Diana Process Oil PW-380, produced by Idemitsu Kosan Co., Ltd.); | 5 parts by weight |
| Antioxidant (Irganox 1010, produced by BASF Japan) | 1 part by weight |
| Organic peroxide (Percumyl D, produced by NOF Corporation; dicumyl peroxide,) | 3 parts by weight |
| Vulcanization accelerator (Taic, produced by Nippon Kasei Chemical Company Limited) | 0.5 parts by weight |

Among the above components that were aimed at a crosslinked product having a JIS A hardness of 75, the components other than an organic peroxide and a vulcanization accelerator were each kneaded with a kneader. Then, the organic peroxide and the vulcanization accelerator were added and kneaded with an open roll.

For the obtained open roll kneaded material, the stickiness of the surface of the unvulcanized rubber compound was measured using a tackiness checker (HTC-1, produced by Toyo Seiki Seisaku-sho, Ltd.). The results were evaluated as follows: 0 to less than 8 N: ◯, and 8 to 20 N: X.

Further, for the crosslinked product obtained by a primary crosslinking at 180° C. for 8 minutes and a secondary crosslinking at 180° C. for 24 hours, the TR10 value and the TR70 value were measured according to JIS K6261 at a recovery of 10% and 70% with respect to deformation in a low temperature region.

Example 2

In Example 1, the amount of the fatty acid amide lubricant was changed to 1 part by weight.

Example 3

In Example 1, the same amount (2 parts by weight) of a fatty acid ester-based lubricant (Struktol WB222, produced by Schill+Seilacher "Struktol" AG; flow temperature: 65° C.) was used in place of the fatty acid amide lubricant.

Example 4

In Example 1, the same amount (2 parts by weight) of an organosilicone-based lubricant (Struktol WS180, produced by Schill+Seilacher "Struktol" AG; flow temperature: 90° C.) was used in place of the fatty acid amide lubricant.

Comparative Example 1

In Example 1, the fatty acid amide lubricant was not used.

Comparative Example 2

In Example 1, the amount of the fatty acid amide lubricant was changed to 3 part by weight.

Comparative Example 3

In Example 1, the same amount (2 parts by weight) of a fatty acid derivative having a flow temperature 102° C. (Struktol WB16, produced by Schill+Seilacher "Struktol" AG) was used in place of the fatty acid amide lubricant.

Comparative Example 4

In Example 1, the same amount (2 parts by weight) of a fatty acid derivative having a flow temperature 105° C. (Struktol HT204, produced by Schill+Seilacher "Struktol" AG) was used in place of the fatty acid amide lubricant.

Following table shows the results obtained respectively in the above Examples and Comparative Examples.

TABLE

| Example | Sticking between Unvulcanized rubber compound | TR10 (° C.) | TR70 (° C.) |
|---|---|---|---|
| Example 1 | ◯ | −57 | −40 |
| Example 2 | ◯ | −57 | −41 |
| Example 3 | ◯ | −57 | −39 |
| Example 4 | ◯ | −57 | −40 |
| Comparative Example 1 | X | −57 | −42 |
| Comparative Example 2 | ◯ | −57 | −37 |
| Comparative Example 3 | X | −57 | −40 |
| Comparative Example 4 | X | −57 | −40 |

The above results reveal that in Comparative Example 2, in which 3 parts by weight of a fatty acid amide lubricant was used, the evaluation of sticking between unvulcanized rubber compound is ◯, but the TR70 value increases by 5° C. as compared with Comparative Example 1, in which no fatty acid amide-based lubricant was added, thus indicating that there is a concern that the low temperature sealing properties may be affected.

The invention claimed is:

1. A rubber composition comprising 0.1 to 2.5 parts by weight of a lubricant having a flow temperature of 60 to 90° C. based on 100 parts by weight of an ethylene/butene/5-ethylidene-2-norbornene terpolymer;
wherein the lubricant is
a fatty acid amide-based lubricant,
a fatty acid ester-based lubricant, or
an organosilicone-based lubricant.

2. The rubber composition according to claim 1, wherein 0.5 to 10 parts by weight of an organic peroxide is further compounded.

3. A crosslinked molded product obtained by crosslinking and molding the rubber composition according to claim 2.

4. The crosslinked molded product according to claim 3, which is a seal member having a TR70 value specified in JIS K6261 corresponding to ISO 2921 of −39° C. or lower.

* * * * *